Jan. 26, 1937.  A. J. SYROVY  2,068,776
POWER TRANSMISSION
Filed Feb. 8, 1934
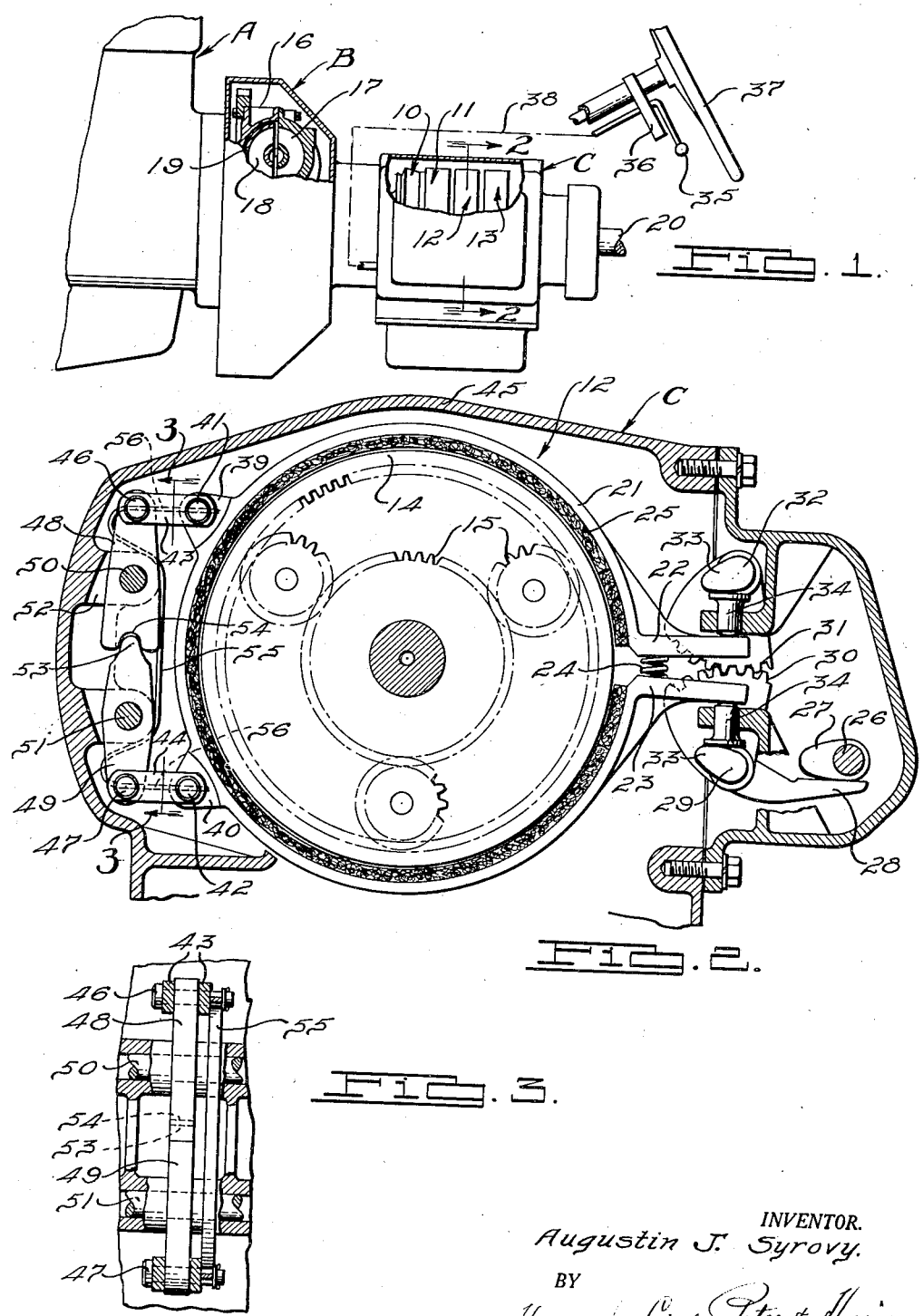
INVENTOR.
Augustin J. Syrovy.
BY
Harness, Lind, Patee & Harris
ATTORNEYS.

Patented Jan. 26, 1937

2,068,776

UNITED STATES PATENT OFFICE 2,068,776

POWER TRANSMISSION

Augustin J. Syrovy, Detroit, Mich., assignor to Chrysler Corporation, Detroit, Mich., a corporation of Delaware Application February 8, 1934, Serial No. 710,213

9 Claims. (Cl. 188—77)

This invention relates to power transmission devices and refers more particularly to improvements in power transmission devices especially adapted for use in connection with motor vehicles, although not necessarily limited thereto.

My invention has among its objects the provision of improvements in the drive and control for power transmission systems of the type including the well-known epicyclic or planetary transmission gear box. With such epicyclic transmissions, it is customary to arrange the gearing to provide for the desired number of speed ratios between the engine and vehicle driving ground wheels and such gearing is customarily selected and controlled to obtain the desired ratio by actuation of any one of a group of transmission gearing controlling clutches usually consisting of reaction brake bands associated with and controlling the rotation of corresponding drums or similar elements of the various epicyclic gear trains or sets of planetary gearing.

A further object of my invention resides in the provision of improvements in the braking means for establishing the reactionary rotary control for one or more of the gear sets of an epicyclic type gear box. While this feature of my invention is not necessarily limited in the application thereof to epicyclic gear boxes, it has particular significance when applied to the rotary controlling elements of such gear boxes since my invention provides for improved distribution of braking effort to the rotary drums and centering of the brake bands associated with the drums. Difficulty has been experienced in epicyclic gear boxes in connection with objectionable tendency toward displacement of the axis of the rotary drum when the braking effort is applied thereto to obtain a driving ratio through the gear box. My invention tends to remove such difficulties by providing a braking mechanism adapted to substantially balance the braking forces circumferentially around the drum without the aforesaid tendency toward objectionable displacement of the drum axis.

A further object of my invention resides in the provision of braking means having improved efficiency, especially in connection with drums of epicyclic gear boxes; the braking means being further improved from the standpoint of simplicity, ease of service for making repairs, and ability to assemble and operate the braking mechanism within the limited space ordinarily available in gear boxes of the types referred to. My invention is particularly characterized in the provision of an improved self-centering and anchorage mechanism for the braking means, this anchoring mechanism being positioned to one side of each of the aforesaid drums, the brake applying mechanism being located on the opposite side whereby the casing of the transmission may be kept relatively low in close association with the rotary drums and the weight and cost of the transmission being thereby reduced.

Further objects and advantages of my invention will be apparent from the following detailed description of one embodiment thereof, reference being had to the accompanying drawing in which:

Fig. 1 is an elevational view somewhat diagrammatic in portions, illustrating my power transmission device, portions of the casing of the clutch and transmission being broken away to illustrate the parts thereof.

Fig. 2 is an enlarged sectional elevational view through a typical planetary gear set and rotary drum associated therewith, the section being taken along the line 2—2 of Fig. 1.

Fig. 3 is a sectional elevational view of the brake anchorage mechanism illustrated in Fig. 2, the section being taken along the line 3—3 of Fig. 2.

In the drawing I have shown for illustrative purposes my power transmitting device or system which may include a main prime mover or engine A, a portion of which is shown in Fig. 1, a clutch B driven from the engine, and a change speed transmission or gear box C.

I have illustrated the change speed transmission C as the epicyclic or planetary type, this general form of transmission being well known in the art and, as usual, includes a plurality of controlling clutches 10, 11, 12, and 13, these clutches being adapted to act on transmission elements associated therewith usually embodied in the form of a rotary drum, one of which is illustrated at 14 in Fig. 2 in association with the second speed transmission controlling clutch 12. In the illustrated embodiment the controlling clutch 10 is ordinarily arranged as the third speed or direct drive control, the controlling clutch 11 being the first or low speed control, and 13 representing the reverse controlling clutch. It will be understood that the various transmission controlling clutches may be adapted in the well-known way for causing actuation of the respective planetary gear trains associated therewith, these gear trains being well known in the art. In Fig. 2 I have somewhat diagrammatically illustrated one of the planetary gear trains at 15 in association with the rotary drum 14 of the transmission controlling clutch 12.

While any form of clutch may be employed to control the drive from engine A to transmission C, I prefer to employ a clutch B of the fluid coupling type, this general type of clutch being illustrated in Fig. 1 and consisting of a driving outer casing structure 16 provided with the usual driving vanes 17 for directing the fluid flow toward the vanes 18 of the driven clutch member 19, the latter being adapted to transmit the drive through the fluid medium to the transmission C as will be readily understood.

I will now describe the details of a typical transmission controlling clutch, reference being had particularly to Fig. 2 in which the controlling clutch 12 is shown associated with the rotary drum or transmission element 14, this clutch or brake and cooperating drum in my illustration being the control mechanism for obtaining the second speed ratio in the drive from engine A through transmission C to the drive shaft 20 extending therefrom for the power take-off, it being understood that where the mechanism is installed in a motor vehicle, this shaft 20 is adapted in the well-known manner to propel the driving ground wheels of the vehicle (not shown).

In order to brake the drum 14 I have provided a band 21 extending around the drum to provide adjacent ends 22, 23 arranged at one side of the drum. These band ends are normally separated by a spring 24 tending to expand the band so that the brake lining 25 does not contact with drum 14 except when the second speed controlling clutch 12 is actuated to drive the vehicle.

Any suitable means may be employed to apply a force to contract the ends 22, 23 of the band 21, the means illustrated consisting in a shaft 26 provided with a cam 27 engageable with a lever 28. This lever is pivoted at 29 and carries a gear segment 30 meshing with a corresponding gear segment 31 pivoted at 32. Each of the gear segments is provided with a cam 33 acting on a cam follower or plunger 34, these plungers respectively acting on the band ends 22, 23 so that when the actuating cam 27 is rotated to depress lever 28, the band ends will be simultaneously brought toward each other to compress spring 24 and contract the band 21 to arrest the rotation of drum 14. When cam 27 is rotated in the opposite direction to relieve the lever 28, the spring 24 will restore the parts to the normal position of non-braking action of drum 14 so that the latter may freely rotate. It will be understood that each of the controlling clutches is provided with a mechanism similar to that illustrated in Fig. 2, appropriate selector mechanism and controls responsive thereto being provided so as to cause selective actuation of the controlling clutches under conditions desired by the vehicle driver. In Fig. 1 I have illustrated the customary manual selector arm 35 adjustable about a selector segment 36, the latter being conveniently located adjacent the vehicle steering wheel 37 for example, the motion of the selector arm 35 being transmitted to the selector controlling devices of the transmission by a suitable linkage diagrammatically illustrated at 38. The details of the selector controlling mechanism does not in itself form any part of this invention and, since such mechanisms in many forms are well known in the art, such mechanism has not been illustrated in detail.

In order to anchor the band 21 and guide the same during its contracting movement so as to efficiently distribute the braking forces applied to drum 14 without substantial tendency toward axial displacement of the drum, I have provided a pair of circumferentially spaced anchors 39 and 40 extending outwardly from band 21, these anchors being respectively pivoted by pins 41 and 42 to the links 43 and 44. The anchors 39 and 40 are preferably located to one side of the band 21 or drum 14 opposite to the side thereof where the brake applying mechanism previously described is located, the upper casing 45 of transmission C being thereby closely associated with the transmission controlling clutches.

The links 43 and 44 are respectively pivoted at 46 and 47 to levers 48 and 49, the latter having fixed pivots 50 and 51 provided by the inwardly extending projections 52 of the transmission casing. The levers 48 and 49 have their opposite ends interengaged by reason of a projection 53 of lever 49 extending into a recess 54 of lever 48, whereby movement of one lever will cause corresponding movement of the other lever. This arrangement of levers and links tends to equalize the braking effort applied by band 21 to drum 14 as aforesaid, it being apparent that any tendency of a portion of the band adjacent one of the ends thereof to engage the drum more than the other portion adjacent the other band end will immediately be offset by reason of the transference of the braking effort between the band portions through the aforesaid arrangement of levers and links.

In order to assist in holding the levers and links of my brake anchoring mechanism in the proper positions prior to actuation of the braking mechanism and also during the braking action, I have provided a novel arrangement of tension means acting on the levers and links, this means being illustrated in the form of a spring wire 55 having its ends 56 respectively extending through the pivot pins 41, 46 and 40, 47, the spring wire being reversely curved adjacent said ends around the projections 52 as best shown in Figs. 2 and 3. This spring wire keeps the levers and links from rattling, takes up any wear, and further assists in yieldingly urging the portion of band 21 diametrically opposite the ends 22, 23 away from engagement with drum 14 when the braking mechanism is not being applied.

It will be noted that the brake band 21 is self-centering with respect to the drum 14, links 43, 44 permitting vertical shifting of the band and levers 48, 49 permitting lateral band shifting. Thus, the drum is relieved of a load which would otherwise occur.

In operation of the power transmission mechanism, the engine A transmits its power to transmission C through the intermediary of the fluid coupling or clutch B, the transmission C driving the power take-off shaft 20 in the various gear ratios under control of the operator by actuation of the selector arm 35. The setting of the selector arm 35 determines which of the controlling clutches will be actuated by a corresponding cam 27 so as to contract the ends 22, 23 of the respective brake band. When a braking effort is applied to a brake band such as the band 21 for example, the brake band is maintained in centered condition and the braking effort is equalized or distributed around the associated drum 14 by reason of my equalizing anchoring and self-centering mechanism including interengaging levers 48 and 49 and the associated links 43 and 44 respectively.

While I have illustrated my power transmission mechanism in connection with a transmission of the planetary type, I desire to point out that I do not limit my invention in its broader aspects to this particular type of transmission since other forms of transmissions may be employed with the fundamental principles of my inventions if desired. Likewise various changes and modifications may be made throughout my power transmission and within the scope of the appended claims, and it is not my intention to limit my inventions to the particular combinations and arrangement of parts shown and described herein for illustrative purposes.

What I claim is:

1. In a transmission of the planetary type having a rotary control drum, a brake band around said drum having substantially adjacent ends positioned to one side of said drum, a pair of circumferentially spaced links pivotally connected to said band at substantially the side of said drum opposite to that aforesaid, and levers pivoted intermediate their ends, said levers being respectively pivoted to said links at one end thereof and being connected together at their other ends.

2. In a transmission of the planetary type having a rotary control drum, a brake band around said drum having substantially adjacent ends positioned to one side of said drum, a pair of circumferentially spaced links pivotally connected to said band at substantially the side of said drum opposite to that aforesaid, levers pivoted intermediate their ends, said levers being respectively pivoted to said links at one end thereof and being connected together at their other ends, and spring means acting on said links for yieldingly spacing said band from said drum.

3. In a transmission of the planetary type having a rotary control drum, a brake band around said drum having substantially adjacent ends positioned to one side of said drum, a pair of circumferentially spaced links pivotally connected to said band at substantially the side of said drum opposite to that aforesaid, levers pivoted intermediate their ends, said levers being respectively pivoted to said links at one end thereof and being connected together at their other ends, and a spring wire having opposite ends thereof extending respectively along said links and acting to yieldingly space said band from said drum.

4. In a transmission having a rotary drum, braking means associated with said drum, means for actuating said braking means for braking said drum, anchoring means for said braking means, said anchoring means being located substantially diametrically opposite said actuating means and including a pair of connected levers, means for pivotally mounting said levers, one of said levers having an end thereof interengaged with an end of the other of said levers, and means for connecting said levers to said braking means.

5. In a transmission having a rotary drum, braking means associated with said drum, means for actuating said braking means for braking said drum, anchoring means for said braking means, said anchoring means being located substantially diametrically opposite said actuating means and including a pair of levers connected together at one end thereof, means for pivotally mounting said levers at points spaced around said drum, and links respectively connecting the other ends of said levers with said braking means at circumferentially spaced points thereof.

6. In a transmission of the planetary type having a rotary control drum, a continuous substantially circular brake band surrounding said drum and having adjacent ends positioned to one side of the transmission, means acting on said adjacent ends for contracting said band into braking engagement with said drum, and anchoring means for said band adapted to center the band with said drum during said braking engagement, said anchoring means including a pair of circumferentially spaced links pivoted to said band and extending laterally therefrom at the side of said transmission opposite to that aforesaid, and means pivotally connecting the outer ends of said links, said connecting means being pivotally anchored to the transmission.

7. In a transmission of the planetary type having a rotary control drum, a continuous substantially circular brake band surrounding said drum and having adjacent ends positioned to one side of the transmission, means acting on said adjacent ends for contracting said band into braking engagement with said drum, anchoring means for said band adapted to center the band with said drum during said braking engagement, said anchoring means including a pair of circumferentially spaced links pivoted to said band and extending laterally therefrom at the side of said transmission opposite to that aforesaid, and a pair of levers respectively pivoted to the outer ends of said links, said levers being pivotally connected together and each being supported for pivoting movement by said transmission.

8. In a transmission of the planetary type having a rotary control drum, an annular brake band operably associated with said drum and having substantially adjacent ends disposed for operation to cause the band to engage the drum, a pair of links pivotally connected to the band at points spaced circumferentially substantially less than 180° from each other, and levers pivoted intermediate their ends, said levers being respectively pivoted to said links at one end thereof and being connected together at their other ends.

9. In a transmission of the planetary type having a rotary control drum, an annular brake band operably associated with said drum and having substantially adjacent ends disposed to one side of said drum for operation to cause the band to engage the drum, a pair of links disposed substantially parallel to each other and pivotally connected to the band at substantially the side of said drum opposite to that aforesaid, said link pivots being spaced circumferentially substantially less than 180° from each other, and levers pivoted intermediate their ends, said levers being respectively pivoted to said links at one end thereof and being connected together at their other ends.

AUGUSTIN J. SYROVY.